United States Patent [19]

Vialatte nee Geolier

[11] Patent Number: 4,461,778
[45] Date of Patent: Jul. 24, 1984

[54] DEACIDIFICATION OF FOOD LIQUIDS

[75] Inventor: Christiane S. E. L. Vialatte nee Geolier, Champigny sur Marne, France

[73] Assignee: SOFRALAB, Societe Francaise des Laboratoires d'Oenologie, Champigny sur Marne, France

[21] Appl. No.: 356,619

[22] Filed: Mar. 10, 1982

[30] Foreign Application Priority Data

Mar. 11, 1981 [FR] France .................. 81 04828

[51] Int. Cl.³ .................. C12H 1/10; C12G 1/00; A23L 3/34
[52] U.S. Cl. .................. 426/422; 426/15; 426/330.4; 426/592; 426/490
[58] Field of Search .................. 426/15, 422, 490, 592, 426/330.4

[56] References Cited

U.S. PATENT DOCUMENTS 4,112,128  9/1978  Fessler .................. 426/15
4,322,446  3/1982  Heess et al. .................. 426/330.4

OTHER PUBLICATIONS

Amerine et al., The Technology of Wine Making, 3rd. Ed., The Ari Publishing Co., Inc., Westport, Conn., 1972, (pp. 210-215).

Primary Examiner—David M. Naff
Attorney, Agent, or Firm—Browdy and Neimark

[57] ABSTRACT

Food liquids such as wines are deacidified by removing malic acid without substantially affecting the tartaric acid content of the liquids. Deacidification is carried out by adding to the liquid calcium carbonate, potassium bicarbonate, calcium tartrate and a calcium double salt of tartaric and malic acids to cause precipitation of crystals of tartromalate from the liquid. The amount of calcium carbonate is sufficient to increase the pH of the food liquid to 4.5. The amount of calcium tartrate is sufficient to eliminate the portion of malic acid beyond the tartaric acid stoichiometrically equivalent content.

8 Claims, No Drawings

DEACIDIFICATION OF FOOD LIQUIDS

The object of the present invention is a product and a method for deacidification of food liquids particularly wines, in order to eliminate a portion of the malic acid beyond the tartaric acid stoichiometrically equivalent contents. More especially, the invention relates to a product and a method for eliminating the malic acid whatever is the tartaric contents in the product.

The acidity of musts, wines, and generally speaking of all products orginating from grapes, is due to the presence in the grape juice of tartaric acid but also of malic acid.

During the maturation period of the grapes, there is an increase in the sugar contents and a decrease in the acid content, and primarily a decrease of the malic acid content, but when the maturation is insufficient, due to climatic conditions, the wine is too acid and this excess acidity is mainly due to the malic acid. Therefore, it is this acid which it should be desirable to eliminate, at least in part. Actually, in some years, it is possible to have grapes with contents of 8 to 10 grammes per liter (g/l) of malic acid and only 2 grammes per liter (g/l) of tartaric acid.

The deacidification of musts and wines can be obtained by addition of basic ions: potassium ions in the form of potassium bicarbonate and calcium ions in the form of calcium carbonate. Theoretically, 1 g/l of potassium bicarbonate decreases the must or wine acidity by 0.49 g/l expressed as sulphuric acid with addition of 390 mg/l of potassium. Such a deacidification can be followed with a precipitation of potassium bitartrate, an acid salt of tartaric acid with a small solubility, with again acidity reduction and therefore elimination of part of the tartaric acid. One gramme per liter of calcium carbonate reduces the must or wine acidity by 0.98 mg/l expressed as sulphuric acid with addition of 400 mg/l of calcium, and precipitation of calcium tartrate; the latter precipitation does not bring about a reduction of acidity, the calcium tartrate being a neutral salt; it eliminates a portion of the calcium added with a portion of the wine tartaric acid. In such deacidifications, nothing is done as regards the malic acid, the potassium or calcium salts of which are very soluble, but on the other hand undesirably large quantities of tartaric acid can be eliminated and the wine balance destroyed.

Double deacidification allows precipitating molecularly equivalent quantities of tartaric acid and of malic acid in the form of a double salt of the L+tartaric acid, of the L−malic acid and of calcium, calcium tartromalate having a very small solubility at pH greater than 4.5. In this case, a portion of the wine or must is completely deacidified by bringing it to a pH greater than 4.5 with calcium carbonate, the double salt precipitates, then is eliminated, the wine residual acidity being of the order of 1.5 g/l expressed as sulphuric acid. Portion of the deacidified wine is mixed with the initial remaining acid wine in proportions corresponding to the desired acidity reduction for the final mixture.

Such a method permits eliminating malic acid, but only if the wine contains also sufficient tartaric acid contents. 2 g of calcium carbonate can precipitate 1.5 g of tartaric acid and 1.34 g of malic acid, and reduce the acidity by 1.96 g expressed as sulphuric acid. If the malic acid contents are too high relative to those of tartaric acid (malic acid contents greater than 1.34/1.5 of tartaric acid), a portion of the calcium carbonate added for bringing the deacidified portion to a pH of 4.5 is in the form of soluble calcium malate, and at the moment of the final mixture the calcium thus in excess reprecipitates with the acid wine tartaric acid as in a standard deacidification with calcium carbonate with again a loss of tartaric acid.

The present invention enables precipitating the malic acid whatever the initial tartaric acid content of the liquid by bringing the tartaric acid necessary for the formation of a double salt in the form of calcium tartrate. The calcium tartrate can be added to the reaction medium during the calcium carbonate deacidification, and the invention provides a product for the deacidification of various food liquids such as wine, said product being principally composed of calcium carbonate and calcium tartrate; such a composition in a correct proportion is mixed with a certain quantity of the liquid to be deacidified for reducing the pH to a value allowing precipitation by crystallization of the calcium tartromalate in a preferential crystalline form.

The invention applies also to a method for using the product hereabove described in which there is added, after the possible determination of the tartaric and malic acid contents of the liquid to be deacidified, an appropriate quantity by weight of the product which is mixed with some liters of the liquid, while being stirred; then there is added another quantity of the liquid, still while stirring, and while maintaining a pH value greater than 4.5 at all points of the medium; the crystals in formation are kept in suspension in the liquid during a sufficient period by stirring or circulating the liquid; after which the liquid having rested is subjected to an operation allowing the elimination of the formed calcium tartromalate crystals, and there is finally added the rest of the liquid to be deacidified for obtaining a product having an acceptable acidity.

Various other features of the invention will become apparent from the following detailed description.

In the method according to the invention, the acid juice (must, wine or any other juice of natural origin containing malic acid) is brought to a pH greater than 4.5 by a product containing calcium carbonate and calcium tartrate, as well as, possibly, double salts of calcium tartromalate. The calcium tartrate can be introduced in the juice to be deacidified independently from the calcium carbonate during the deacidification operation. The aim is substantially a deacidification involving tartaric acid of the product as little as possible, by eliminating the malic acid and not risking enriching the product with exogenous tartaric acid. The operation according to the invention is shown in the herebelow diagramm where a double calcium tartrate molecule plus two calcium carbonate molecules plus two malic acid molecules can give two molecules of calcium tartromalate double salts with detachment of two carbonic acid gas molecules.

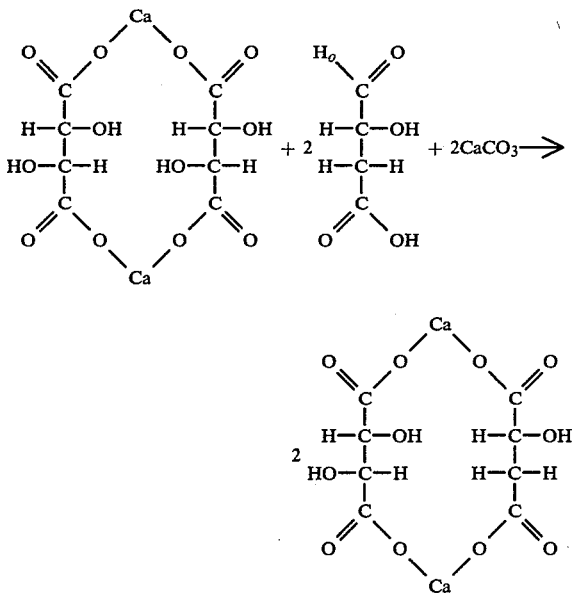

Therefore, it is not necessary to have in the juice to be deacidified equivalent quantities of tartaric acid and malic acid. The product according to the invention can contain, in addition to calcium carbonate and calcium tartrate, a small quantity of potassium bicarbonate in order to promote the pH elevation wherein the juice to be deacidified has a very small pH value, as well as small quantities of a calcium double salt of the tartaric and malic acids for promoting the calcium tartromalate crystallization in a preferential crystalline form.

The proportions of the various components of the product according to the invention can vary according to the composition of the product to be deacidified, but generally, they are the following:

| calcium | 22 to 40% by weight of product |
|---|---|
| Potassium | 0 to 5% by weight of product |
| tartaric acid | 5 to 40% by weight of product |
| malic acid | 0 to 3% by weight of product |
| excipient vehicle | for 100% by weight of product |

The deacidification power of the product of the invention is generally comprised between 28% and 100%, expressed as $H_2SO_4$ (sulphuric acid).

Example of a wine deacidification with a product according to the invention having a deacidifying power of 32%.

One starts for example with a wine having the following analytical contents:

| pH | 3.05 |
|---|---|
| Total acidity in g/l expressed as $H_2SO_4$ | 6.35 |
| Tartaric acid in g/l | 3 |
| Malic acid in g/l | 6.7 |
| Calcium in g/l | .091 |

What is required is to bring down the acidity of this wine 2 g/l, or in other words to bring it back to 4.35 g/l.

$2/0.32 = 6.25$ g/l of the product of the invention will then have to be used.

After deacidification to a pH of 4.5, the wine total acidity can be less than 1 g/l; therefore the wine percentage used "x" will then be such that:

| x (1) wine deacidified to pH 4.5 | + (100 − x)6.35 acid wine | = 100 × 4.35 final mixture |
|---|---|---| or 37.4% of the totality of the acid wine.

For providing the deacidification of 100 l of wine, 650 g of the product of the invention will be put into a vat, and from 1 to 2 liters of acid wine will be poured on top for obtaining by mixture a slurry in which will be added, little by little, the rest of the 37.4 l of acid wine, still under stirring. Stirring is maintained until the pH is stabilized at about 4.5. This operation can last from 12 to 24 hours and even more according to the stirring conditions.

The deacidified wine will be left to settle to a pH of 4.5, then the calcium tartromalate crystals formed during the deacidification operation will be eliminated by filtration, centrifuging or any other separation mechanical method.

The deacidified wine analysis is then about as follows:

| pH | 4.5 |
|---|---|
| Total acidity expressed as $H_2SO_4$ g/l | 1 |
| Tartaric acid g/l | 0 |
| Malic acid g/l | 1 |
| Calcium g/l | .110 |

Therefore, there has been an elimination in the form of a double salt:

| Tartaric acid | 112 g |
|---|---|
| Malic acid | 213 g |

The deacidified wine at a pH of 4.5 is mixed with 62.6 l of acid wine to provide 100 l of wine having a total acidity of 4.35 g/l.

The analysis of the final wine is the following:

| pH | 3.2 |
|---|---|
| Total acidity expressed as $H_2SO_4$ g/l | 4.35 |
| Tartaric acid g/l | 1.9 |
| Malic acid g/l | 4.55 |
| Calcium g/l | .098 |

Therefore, the method according to the invention enables to decrease in large proportions the acidity of the wine by eliminating more malic acid than tartaric acid.

Practically, one can mix the product of the invention with a small portion of the product to be neutralized (3 to 8%) for forming a slurry having a pH greater than 6. This slurry is placed in a deacidification vat having if possible a stirrer and is circulated by a short and high flow rate circuit permitting carrying away the crystals. A union tube allows injecting the acid product in the product being deacidified, at a very low flow rate. A pH meter-controlled valve enables adjusting the flow rate so as not to be in danger of coming down to a pH less than 4.5 at which the calcium tartromalate salts are soluble. The liquid to be deacidified, for example wine, is not in danger of being oxidized since there is an emission of carbonic acid gas in the deacidification vat.

I claim:

1. A product for deacidifying malic acid containing food liquids, which comprises a mixture of an amount sufficient of calcium carbonate to increase the pH of the food liquid to at least 4.5, the quantity of calcium in said product being 22–40%;

an amount of potassium bicarbonate to provide said product with a quantity of potassium of up to 5%; and an amount sufficient of calcium tartrate to eliminate that portion of the malic acid beyond the tartaric acid stoichiometrically equivalent content, said product further comprising a calcium double salt of tartaric and malic acids, whereby the amount of tartaric acid in said product is 5–40% and the amount of malic acid is up to 3%;

whereby said mixture causes precipitation of crystals of tartromalate when added to the food liquid.

2. A method for deacidifying food liquids containing an undesirably high quantity of malic acid, comprising adding to a portion of said liquid and mixing therewith an amount sufficient of calcium carbonate to increase the pH of the food liquid to at least 4.5, an amount sufficient of calcium tartrate to eliminate that portion of the malic acid beyond the tartaric acid stoichiometrically equivalent content, an amount of potassium bicarbonate and an amount of a calcium double salt of tartaric and malic acids, whereby the quantities of ions added to said liquid comprising by weight:

22–40% calcium
up to 5% potassium
5 to 40% tartaric acid
up to 3% malic acid;

thereby forming a mixture having a pH at which in the malic acid is caused to precipitate in the form of crystals of calcium tartromalate.

3. A method according to claim 2, further comprising the step of determining the tartaric and malic contents of the liquid to be deacidified before said adding.

4. A method according to claim 2, comprising the steps of:

prior to said adding, determining total acidity of a liquid to be deacidified;

effecting said adding while stirring;

then adding a remaining portion of the liquid to be deacidified, still while stirring and while maintaining a pH value above 4.5 at all points of the liquid, thereby forming crystals of tartromalate; and stirring or circulating the liquid to maintain in suspension the crystals being formed.

5. A method according to claim 4, wherein said remaining portion of liquid is added via a pH meter-controlled valve allowing to maintain the pH value at a determined value above 4.5.

6. A method according to claim 4, wherein the stirring is maintained for a period of time between a few hours and a few days.

7. A method according to claim 4, comprising the further step of eliminating the crystals by filtration.

8. A method according to claim 4, comprising the further step of eliminating the crystals by centrifugation.

* * * * *